United States Patent [19]
Takahashi et al.

[11] Patent Number: 6,032,920
[45] Date of Patent: Mar. 7, 2000

[54] ACTUATOR AND EXHAUST BRAKE UNIT THEREOF

[75] Inventors: Masanori Takahashi; Masahiro Tokunaga, both of Kiyose, Japan

[73] Assignee: Nippon Thermostat Co., Ltd., Kiyose, Japan

[21] Appl. No.: 08/939,653

[22] Filed: Sep. 29, 1997

[30] Foreign Application Priority Data

Dec. 26, 1996 [JP] Japan .................................. 8-356833
Mar. 5, 1997 [JP] Japan .................................. 9-067274

[51] Int. Cl.$^7$ .................................................. F16K 31/126
[52] U.S. Cl. .......................... 251/58; 251/61.5; 251/308; 137/907
[58] Field of Search .................. 251/58, 61, 305, 251/308, 61.5; 137/907

[56] References Cited

U.S. PATENT DOCUMENTS

| | | | |
|---|---|---|---|
| 2,795,976 | 3/1961 | Smith et al. | 137/506 |
| 2,833,144 | 4/1959 | Kendig | 251/308 X |
| 3,450,382 | 6/1969 | Calim | 251/58 |
| 3,542,331 | 11/1970 | Canalizo | 251/58 X |
| 3,650,506 | 3/1972 | Bruton | 251/58 X |
| 3,796,408 | 3/1974 | Sheppard | 251/58 |
| 3,929,314 | 12/1975 | Stratynski | 251/58 |
| 4,553,648 | 11/1985 | Suzuki et al. | |
| 4,707,987 | 11/1987 | Atkin | |
| 4,750,459 | 6/1988 | Schmidt | |
| 4,893,698 | 1/1990 | Suzuki | |
| 4,917,221 | 4/1990 | Takikawa et al. | |
| 4,923,167 | 5/1990 | Schmidt | |
| 5,103,786 | 4/1992 | Suzuki et al. | |
| 5,372,109 | 12/1994 | Thompson et al. | |

Primary Examiner—Stephen M. Hepperle
Assistant Examiner—John Bastranelli
Attorney, Agent, or Firm—Oblon, Spivak, McClelland, Maier & Neustadt, P.C.

[57] ABSTRACT

The objection of the present invention is to provide an actuator possible to transmit an output from a power rod of the actuator as rotary motion, and to provide an exhaust brake unit using the actuator, easy to assemble, a small space necessary for installation, able to place the actuator in such a manner that an axis of a power rod of the actuator and an axis of a valve shaft are aligned in a line, and heat transfer from an exhaust channel to the actuator is minimized. The exhaust brake unit is provided with a diaphragm 5 fixed between a first cover and a second cover, dividing into a first room and a second room, a retainer 6 fixed to the diaphragm, a spring 7 installed between the first cover and the retainer 6 or between the second cover and the retainer, a power rod 8 inserted in a movable manner to a concave portion of the retainer 6, a helical groove 8a formed on the outer peripheral surface of the power rod 8, and a protrusion 9 formed on a side wall of the retainer 6 protruding toward the concave portion and having the top end portion inserted into the groove. The top portion of the power rod 8 is connected to a valve shaft 22 of an exhaust gas control valve provided with a butterfly type valve 24 arranged in such a manner that it can open and shut a passage in the exhaust channel, through a lying-U shape connecting member 11.

15 Claims, 10 Drawing Sheets

ACTUATOR AND EXHAUST BRAKE UNIT THEREOF

BACKGROUND OF THE INVENTION

1. Field of the Invention

The present invention relates to an actuator and an exhaust brake unit using the actuator, especially the actuator whose power rod performs a rotary motion and the exhaust brake unit to control exhaust gas control valve such as a butterfly type valve body provided in an exhaust channel of motor vehicle, using the actuator.

2. Description of the Related Art

A diaphragm actuator is well known as a conventional actuator. A standard diaphragm actuator has an upper cover with a negative or positive pressure inlet, a lower cover fixed to the upper cover, a diaphragm installed between the upper cover and the lower cover and is constituted to present an output of the motion of the diaphragm induced through the introduction of negative pressure to the outside mechanisms.

The exhaust brake unit is mounted mainly on trucks or buses and used as an auxiliary brake to counteract the acceleration of vehicles that are descending a hill by closing an exhaust gas control valve arranged at some midpoint on an exhaust pipe.

In the exhaust brake unit, the actuator is used to actuate the exhaust gas control valve arranged in some midpoint on the exhaust pipe in a way that output from a power rod of the actuator is transmitted to the exhaust gas control valve through a link system.

In other words, a linear motion of the power rod of the actuator is converted to rotary motion through the link system to perform an open/close operation of the exhaust gas control valve.

Figure 11:
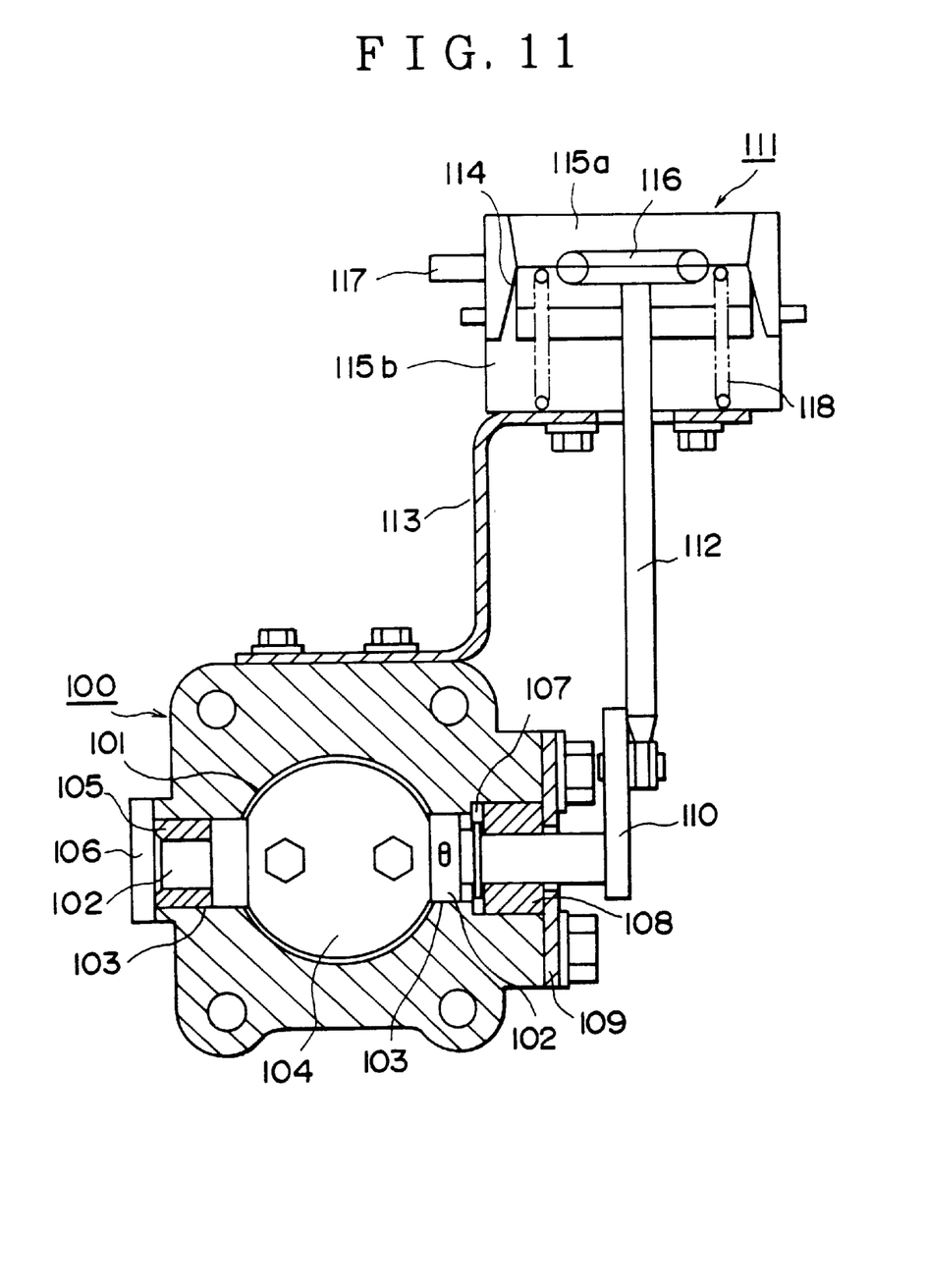
FIG. 11 is a sectional view of a conventional actuator and exhaust gas control valve.

Further, the conventional technique will be explained in detail using FIG. 11 showing an actuator and an exhaust brake unit using the invention disclosed in the bulletin of Japanese Patent Application Laid-open No. Hei 5-171961. FIG. 11 shows a sectional view of an exhaust gas control valve and an actuator.

As shown in the figure, an exhaust channel 101 is formed in a body 100 of the exhaust gas control valve, shaft holes 103 to insert through a valve shaft 102 are bored on both side wall portions, a butterfly type valve body 104 is arranged in the exhaust channel 101 in a way that the butterfly type valve body 104 opens and closes the exhaust channel 101, and the valve body 104 is fixed to the valve shaft 102 with bolts. The right side portion of the valve shaft 102 is extended to connect to the actuator. And the valve shaft 102 is inserted through the shaft hole 103 on the body 100, a bush 105 is slid on the valve shaft in the left shaft hole 103, and the other end of the shaft hole 103 is closed with a closing plate 106.

A seal ring 107 is put on the outer periphery of the valve shaft 102 in the right shaft hole, a bush 108 is inserted on the right of the seal ring 107. The top of the valve shaft 102 protrudes from the body 100, a plate 109 is tightened with screws on the side portion of the body 100 to seal the shaft hole 103. A power rod 112 of a diaphragm actuator 111 is connected to the valve shaft 102 protruding from the body 100 through a link lever 110. The diaphragm actuator 111 is fixed to the body 100 through a bracket 113.

The actuator 111 has on the inside a first room 115a and a second room 115b divided by a diaphragm 114 and a negative pressure inlet 117 is arranged at the side of the first room 115a. The power rod 112 is connected to the central portion of the diaphragm 114 through a retainer 116, and an end portion of the power rod 112 is connected to the valve shaft 102 through the link lever 110. A spring 118 is provided in the second room to return the retainer 116 to the original state.

In the exhaust brake unit thus structured, the exhaust gas control valve is usually conditioned to open the exhaust channel 101.

A switch for the exhaust brake is turned on in a driving state of the engine and when a driver's feet are away from the accelerator pedal and the clutch pedal, the diaphragm 114 and the retainer 116 are moved by the introduction of the negative pressure from a vacuum tank installed on the vehicle in the first room 115a and the power rod 112 gets to move in a linear motion. The motion is converted to rotary motion through the link lever 110 so that the valve body 104 closes the exhaust channel 101.

As a power rod of the conventional actuator is connected to a diaphragm, it moves in a linear motion. Accordingly, in order to operate an exhaust gas control valve such as a butterfly type valve body with the power rod, a link system to convert a linear motion to a rotary motion is essential.

However, as the conventional link system is installed on the outside of an actuator and uses a long lever, a technical problem is an increase in size of the whole exhaust brake unit and the necessity of a large space for the installation into a vehicle.

Especially, when an actuator is vertically installed as shown in FIG. 11, the height of the exhaust brake unit is increased and makes it difficult to install into a vehicle. To solve the problem, there is a case that the actuator is installed in a body so that the actuator is placed parallel to the exhaust channel (the power rod is placed parallel to the exhaust channel).

In this exhaust brake unit, the height can be lowered, but another technical problem is that a heat shield plate becomes necessary between the actuator and the body having the exhaust channel, because the actuator is located near the exhaust channel.

And when the actuator is installed at the place of the power rod intersecting the shaft line of the valve shaft, the linear motion of the power rod is disturbed by the valve shaft so that the linear motion can not be converted to rotary motion. To avoid the problem, the actuator must be so placed that the axis of the power rod does not coincide with the axis of the valve shaft. Another technical problem is the increase in size of the exhaust brake unit.

In the conventional exhaust brake unit, as the linear motion of the power rod is converted to rotary motion of the exhaust gas control valve, the actuator must be so placed that the axis of the power rod be on a surface perpendicular to the shaft line of the valve. Then, the requirement that the actuator is arranged in the shaft line of the valve (actuator is so placed that the axis of the power rod of the actuator is on the same straight line with the shaft line of the valve) can not be satisfied. This limitation in designing a vehicle is yet another technical problem.

Further, when the actuator is assembled with the exhaust gas control valve, the link system must be fitted to the valve shaft and the rod. Thus assembling is not easy.

An object of the present invention is aimed to solve the above described technical problems and to provide an actuator which is able to output the power as rotary motion from the output of the rod of the actuator.

And it is also an object of the present invention to provide an exhaust brake unit which using the actuator, is easy to assemble, requires a small space to install, able to arrange the actuator so that the axis of the power rod and the shaft line of the valve are on the same straight line, and minimizes heat transmission from the exhaust channel to the actuator.

SUMMARY OF THE INVENTION

An actuator relating the present invention for solving these problems has a first cover, a second cover fixed to the first cover, a negative or positive pressure inlet provided on either the first cover or the second cover, a diaphragm dividing into a first room and a second room, attached between the first cover and the second cover, a retainer attached to the diaphragm, a spring attached between the first cover and the retainer or between the second cover and the retainer, a conversion mechanism converting the retainer from a reciprocal motion to a rotary motion and a power rod transmitting the output of the rotary motion through the conversion mechanism to the outside.

Here, the conversion mechanism preferably has a cylindrical outside holder fixed on a T-shape rod fitted in a rotatable manner to the retainer and a bottom surface of the second cover, having an open groove linearly formed along an axis from an end portion to the other end portion, and an inside holder having a bottom and an another open groove to be formed in an arc shape from an end portion to the other end portion, housed in the outside holder in a turnable manner, and having the power rod fixed on the bottom.

It is preferable that the conversion mechanism is provided with an open groove obliquely formed on the side wall of the second cover, a rod fitted in a rotatable manner to the retainer, a shaft attached almost at a right angle to the top of the rod, and the shaft is engaged with the open groove of the second cover.

It is preferable to form a pair of protrusions on the top end portion of the rod and the protrusions are engaged with an open groove of the connecting member having the open groove formed along the axis from one end portion to the other portion.

The exhaust brake unit relating to the present invention for solving the problems features that a power rod of an actuator having a first cover, a second cover fixed to the first cover, a negative or positive pressure inlet provided on either the first cover or the second cover, a diaphragm dividing into a first room and a second room and attached between the first cover and the second cover, a retainer attached to the diaphragm, a spring attached between the first cover and the retainer or between the second cover and the retainer, a conversion mechanism converting the retainer from a reciprocal motion to a rotary motion, and the power rod transmitting the output of the rotary motion through the conversion mechanism to the outside, is so affixed to a valve shaft of an exhaust gas control valve having an exhaust control valve body in which a cylindrical exhaust channel is formed, a shaft hole for inserting through the valve shaft counter bored on both side wall of the body, a butterfly type valve supported by the valve shaft and arranged in a manner that the valve can open and close a passage in the exhaust channel, that the axis of the power rod and the axis of the valve shaft are brought in line.

In the actuator thus constructed, when negative or positive pressure is introduced from the negative or positive pressure inlet provided on either the first cover or the second cover, the retainer attached to the diaphragm linearly moves. The linear movement of the retainer is converted into a rotary movement by the conversion mechanism and the rotary movement is transferred to the outside through the power rod.

Thus the actuator of the present invention can output a rotary movement through the power rod to an outside equipment.

Especially in the actuator having the conversion mechanism according to claim 2, the T-shaped rod vertically moves (a linear motion) along the open groove of the outside holder in a vertical motion (a linear motion) of the retainer, meanwhile the inside holder is rotated by the vertical motion (the linear motion) of the T-shaped rod, because of having a groove formed in an arc shape. The rotary motion of the inside holder is transferred to outside instruments through the power rod.

This sort of conversion mechanism is smaller in size than the conventional link system and can be housed inside an actuator which is also kept small.

Similarly, the actuator having a conversion mechanism according to claim 3 is provided with an open groove obliquely formed on the side wall of said second cover, a rod fitted in a rotatable manner to said retainer, a shaft attached at about a right angle to the top of said rod engaging with the open groove of the second cover. Accordingly, the shaft is rotated by the open groove, resulting in a rotation of the rod.

Further, the conversion mechanism is provided with a connecting member having a open groove formed at the top end portion on the rod from one end to the other end portion.

As the exhaust brake unit thus constructed is provided with an actuator which produces a rotary motion, the actuator can be attached in a manner that the axis of the power rod and the axis of the valve shaft are in a straight line. Consequently, the size of the exhaust brake unit can be minimized and the flexibility of vehicle design can be increased. Especially, as this sort of exhaust brake unit can be lower in height and the actuator is not provided near the exhaust channel, there is no need for protection of the actuator by putting in a heat shield.

And when the actuator is fitted to the valve shaft of the exhaust gas control valve, the power rod can be directly fitted to the valve shaft so that assembling is easy.

The actuator relating to the present invention has a first cover, a second cover fixed to the first cover, a negative or positive pressure inlet provided on either the first cover or the second cover, a diaphragm dividing into a first room and a second room and attached between the first cover and the second cover, a retainer attached to the diaphragm, a spring attached between the first cover and the retainer or between the second cover and the retainer, a power rod inserted in a movable manner into a concave portion of the retainer, a helical fashion groove formed on the outer peripheral surface of the power rod, and a protrusion protruding from the wall of the retainer toward the concave portion so that the top portion of the protrusion is inserted into the groove.

Accordingly, the protrusion moves with the move of the retainer and the power rod is rotated with the move of the protrusion. In other word, the linear motion can develop a power in a form of rotary motion through the power rod.

The system to produce power in a form of rotary motion from the linear motion of the retainer through the power rod is constructed with the power rod inserted in a movable manner into a concave portion of the retainer, a helical groove formed on the outer peripheral surface of the power rod, and a protrusion protruding from the concave wall of the retainer and the top portion of the protrusion being inserted in the groove. The above construction helps to minimize the actuator.

The actuator relating to the present invention is provided with a first cover, a second cover fixed to the first cover, a negative or positive pressure inlet provided on either the first cover or the second cover, a diaphragm dividing into a first room and a second room and attached between the first cover and the second cover, a retainer attached to the diaphragm, a spring attached between the first cover and the retainer or between the second cover and the retainer, a power rod inserted in a movable manner into a concave portion of the retainer, a protrusion formed on an outside surface of the periphery of the power rod, a helical groove formed on the concave wall of the retainer into which the top portion of the protrusion is inserted.

Then, the helical groove moves with the movement of the retainer and the power rod rotates with the movement of the groove. In other words, the linear motion can develop power in a form of rotary motion through the power rod.

And in the same way as previously described, minimization of an actuator is realized.

The protrusion is not the retainer, not the power rod but a cylindrical roller which is preferably attached to the wall of the retainer or the outer peripheral surface of the power rod through a bearing.

As the protrusion is thus formed with a cylindrical roller and attached on the side wall of the retainer or the outer peripheral surface of the power rod, when the cylindrical roller moves through in the groove portion, it rotates centering around the axis of the roller. Consequently, when the linear motion of the retainer is converted into rotary motion of the power rod, the resistance can be minimized. Thus, the linear motion of the retainer can be smoothly converted into rotary motion.

The first cover corresponds to the upper cover and the second cover to the lower cover. It is preferable to be provided with a negative or positive inlet on the upper cover, a diaphragm fitted between the upper cover and the lower cover, dividing into a first room and a second room, a retainer attached on the diaphragm, a spring installed between the upper cover, a power rod inserted in the concave portion of the retainer in a movable manner, and an vent port to ventilate air arranged on the bottom surface of the lower cover.

Thus, as the vent port is provided on the bottom surface of the lower cover, a connection member can be cooled by passing air, especially by the air exhausted from the lower cover (the second room) when the diaphragm is descending. Accordingly, the heat transmitted through the connecting member and the power rod can be minimized and the actuator can be protected from the heat. Then, the upper cover and the lower cover of the actuator can be made from resin so that the weight of the actuator can be decreased.

In the exhaust brake unit relating to the present invention is provided with an actuator having a first cover, a second cover fixed to the first cover, a negative or positive pressure inlet provided on either the first cover or the second cover, a diaphragm dividing into a first room and a second room and attached between the first cover and the second cover, a retainer attached to the diaphragm, a spring attached between the first cover and the retainer or between the second cover and the retainer, a conversion mechanism to convert a linear motion of the retainer into rotary motion, a power rod transferring the power of the rotary motion of the conversion mechanism to the outside, the top portion of the power rod is connected to the exhaust gas control valve having a butterfly type valve arranged in such a manner that the valve can open and shut a passage of the exhaust channel, through a lying-U shape connecting member.

Thus, the top portion of the power rod is so connected to the valve shaft of the exhaust gas control valve through the lying-U shape connecting member that the transmitted heat from the valve shaft can be minimized and the actuator can be protected from the heat. Further, the connecting member is formed in a lying-U shape so that the heat radiation area is large and a heat radiation effect can be obtained with the connecting member.

The conversion mechanism of converting linear motion of a retainer into rotary motion is defined by a mechanism having a power rod inserted into a concave portion of the retainer in a movable manner, a helical groove formed on an outer peripheral surface of the power rod, and a protrusion protruded from a concave portion of the retainer and the top of the protrusion being inserted into the groove or other mechanism having a power rod inserted into a concave portion of the retainer in a movable manner, a protrusion formed on the outer peripheral surface of the power rod and a helical groove inserted into the top portion of the protrusion.

With this mechanism a linear motion of the retainer can be put out from the power rod as rotary motion, and a down sizing of the actuator is realized so that the down sizing of the exhaust brake unit can be realized.

Further, the protrusion is a cylindrical roller, neither the retainer, nor the power rod and it is preferable that the roller is attached to the wall of the retainer or the outer peripheral surface of the power rod through a bearing.

With the construction above described, when linear motion of the retainer is converted into rotary motion of the power rod, the resistance can be minimized so that a smooth movement of the exhaust brake unit can be obtained.

The first cover corresponds to the upper cover and the second cover to the lower cover. It is preferable to be provided with a negative or positive inlet on the upper cover, a diaphragm fitted between the upper cover and the lower cover, dividing into a first room and a second room, a retainer attached on the diaphragm, a spring installed between the upper cover, a power rod inserted in the concave portion of the retainer in a movable manner, and an vent port arranged on the bottom surface of the lower cover confronting a lying-U shape connecting member, and to cool the lying-U shape connecting member with air in flowing-in and exhausted-out through the vent port.

Thus the vent port is provided on the bottom surface of the lower cover, the connecting member can be cooled by air going in and out so that the heat transmitted through the connecting member and the power rod can be minimized and the actuator can be protected from the heat. Then the upper cover and the lower cover can be made from resin and weight reduction of the actuator and more reduction in weight of the exhaust brake can be available.

It is preferable to provide a plate which stops the connecting member at a predetermined turning angle on the end face of the exhaust gas control valve body near the actuator, having a butterfly type valve arranged in such a manner that the valve opens and shuts the passage in the exhaust channel.

As the connecting member can be stopped at a predetermined angle, the butterfly type valve can be fully opened or shut with reliability.

It is also preferable that a collar is placed between the exhaust gas control valve body having a butterfly type valve arranged in such a manner that the valve can open and shut the passage in the exhaust channel, and the cover of the actuator confronting the body.

With the collar, the actuator can be fitted to the body of the exhaust gas control valve keeping a certain amount of distance.

Then, compared with the case that the actuator is provided directly to the body of the exhaust gas control valve, heat transmission can be reduced and the actuator can be protected from heat. Then the upper cover and the lower cover can be made from resin and it becomes possible to reduce the weight of the actuator and the exhaust brake.

When the actuator is assembled on the valve shaft of the exhaust gas control valve, as the power rod can be directly fitted to the valve shaft through the connecting member, the assembling can be smoothly carried out.

BRIEF DESCRIPTION OF THE DRAWINGS

FIG. 5(a), FIG. 5(b), FIG. 5(c) and FIG. 5(d) are diagrammatic sectional views explaining an operating condition of the second embodiment.

FIG. 9(a) and FIG. 9(b) are drawings of the connecting portion of the actuator and exhaust gas control valve relating to the present invention, showing the operating condition.

DETAILED DESCRIPTION OF THE PREFERRED EMBODIMENT(S)

An embodiment of an actuator and an exhaust brake unit relating to the present invention will be explained here. The actuator explained here as an embodiment is the actuator working with negative pressure, but the actuator relating to the present invention is not limited to the actuator particularly working with negative pressure but as a matter of course the actuator working with positive pressure can be applicable.

Figure 1:
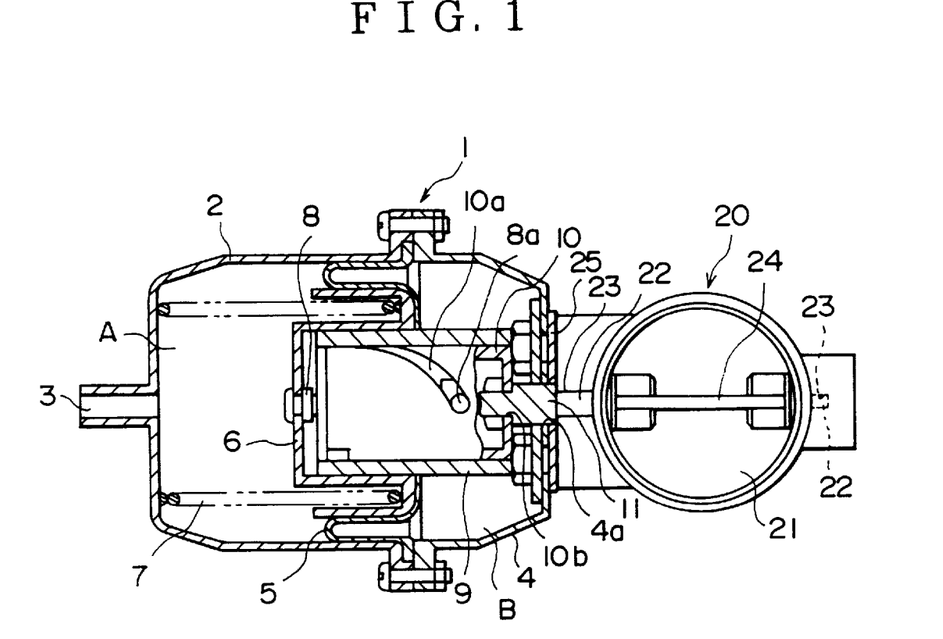
FIG. 1 is a side sectional view of an actuator and an exhaust brake unit relating to the present invention.
Figure 2:
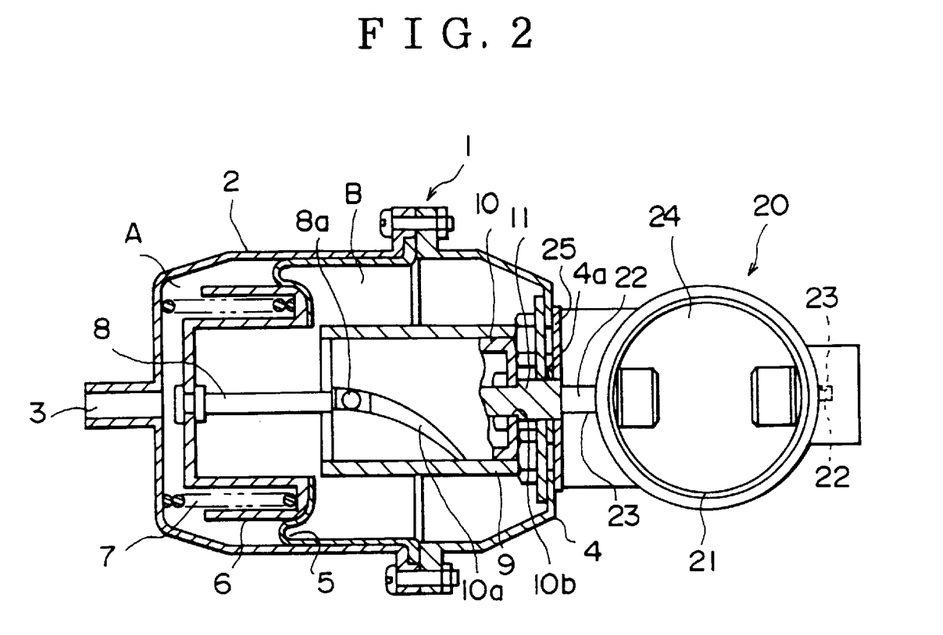
FIG. 2 is a side sectional view of the actuator and exhaust brake unit and FIG. 2 is a drawing showing a state that a butterfly type valve is closed.
Figure 3:
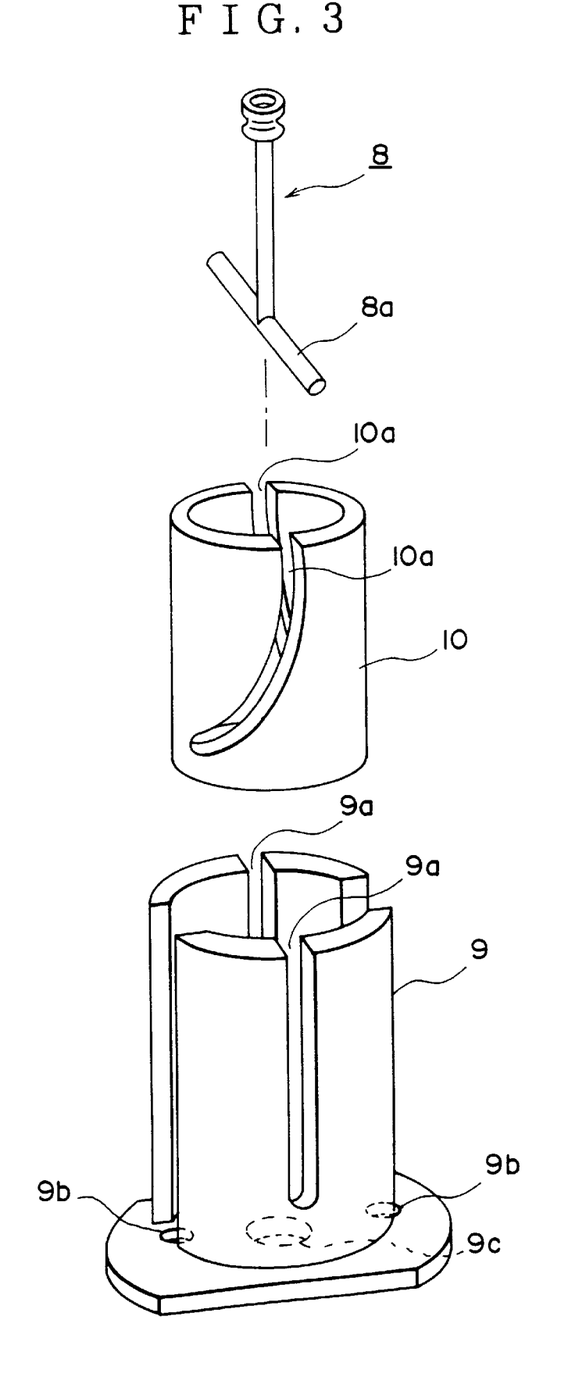
FIG. 3 is a fragmentary exploded perspective view of the actuatorelrelating to the present invention.

FIG. 1 and FIG. 2 are side sectional views of the actuator and the exhaust brake unit relating to the present invention. FIG. 1 shows an opened butterfly type valve body and FIG. 2 shows a closed butterfly type valve body. In FIG. 1 and FIG. 2, a inside holder is shown in partly sectional view. FIG. 3 is a exploded fragmentary perspective view of the actuator relating to the present invention.

In the figures, the actuator 1 is provided with an upper cover 2 (a first cover) having a negative pressure inlet 3, a lower cover 4 (a second cover) fixed to the upper cover 2, a diaphragm 5 attached between the upper cover 2 and the lower cover 4 dividing into a first room A and a second room B, a retainer 6 attached to the diaphragm 5, a spring 7 attached between the upper cover 2 and the retainer 6, a T-shaped rod 8 fitted in a rotatable manner to the retainer 6, a cylindrical outside holder 9 fixed on a bottom surface of the lower cover 4 and having an open groove 9a formed along an axis from one end portion to the other portion, an inside holder 10 having a bottom and another open groove 10a formed in an arc shape from one end portion to the other end portion and housed in the outside holder 9 in a rotatable manner, and a power rod 11 fixed on the bottom surface of the inside holder 10.

An aperture portion 4a being inserted by the power rod 11 is formed on the bottom surface of the lower cover 4. A handguard member is formed on the outside holder 9 as shown in FIG. 3 and is provided with a bolt inserting hole 9b to attach the outside holder 9 to the lower cover 4, and an aperture 9c being inserted by the power rod 11. Further, an aperture 10b through which the power rod 11 is inserted and fixed in the inside holder 10.

The negative pressure inlet 3 may be arranged on the lower cover 4, but in such case, it is necessary to improve accuracy of finishing or to provide an air-tight seal member for preventing air from flowing in through a gap between the power rod 11 and the lower cover 4.

As the spring 7 is to return the retainer 6 to an initial state, the spring 7 can be fixed between the lower cover 4 and the retainer 6, provided that it can return the retainer to the initial state.

A cylindrical exhaust channel 21 is formed in a body 20 of an exhaust gas control valve as shown in the figures, and a shaft hole 23 to insert through a valve shaft 22 is bored on both sides. A butterfly type valve 24 is arranged in the exhaust channel in a reclosable manner and the valve 24 is fixed on the valve shaft 22. The valve shaft 22 is made long to be connected with the actuator.

Incidentally, the power rod 11 and the valve shaft 22 on the actuator side are explained as different members, but the valve shaft 22 on the actuator side may be made long to fix directly to the bottom surface of the inside holder 10.

A collar 25 made from a low thermal conductivity material such as resin is placed between the body 20 and the lower cover 4 to cutoff heat transmission from the exhaust channel 21.

The inside holder 10, the outside holder 9 and a shaft 8a can be coated with a lubricant such as oil to make the movements smooth.

The operation of the actuator and the exhaust brake unit relating to the present invention will be explained here.

Usually, the valve 24 is placed so as to open the cylindrical exhaust channel 21, as shown in FIG. 1. When a switch for the exhaust brake is turned on while the engine is set in motion and a driver's feet are away from the accelerator pedal and a clutch pedal, the actuator 1 changes from the state shown in FIG. 1 to that shown in FIG. 2 due to the negative pressure come from a vacuum tank installed on the vehicle.

In other words, negative pressure is brought into the first room through the negative pressure inlet 3 provided on the upper cover 2, the retainer moves toward the negative pressure inlet 3 in the figure, resisting the resilient force by the spring 7.

The rod 8 is fixed to the retainer 6 and a shaft 8a attached at the top of the rod is engaged to the open groove 9a, 10a of the outside holder 9, inside holder 10.

So, the shaft 8a moves with the movement of the retainer 6 toward the negative pressure inlet 3 in the figure. As described before, the shaft 8a moves without rotation because the shaft is engaged to the open groove 9a of the outside holder 9.

But as the open groove 10a of the inside holder 10 is formed in an arc shape, the inside holder rotates with the climbing of the shaft 8a.

Then, the rotation of the inside holder 10 is transmitted to the power rod 11 integrally fixed with the inside holder 10.

Thus the power rod 11 of the actuator 1 outputs a rotary motion. The rotation is transmitted to the valve shaft 22 connected to the power rod 11 and finally the exhaust channel 21 is closed by the valve 24 as shown in FIG. 2.

As described above, the exhaust brake unit performs a function as an auxiliary brake to cancel the acceleration of a vehicle while descending a downward slope by controlling the exhaust gas amount through the exhaust gas control valve.

When the introduction of the negative pressure from the vacuum tank installed on the vehicle is out, the retainer moves in the opposite direction to the negative pressure inlet 3, the state returns from the condition in FIG. 2 to FIG. 1 reversing the above described process.

Figure 4:
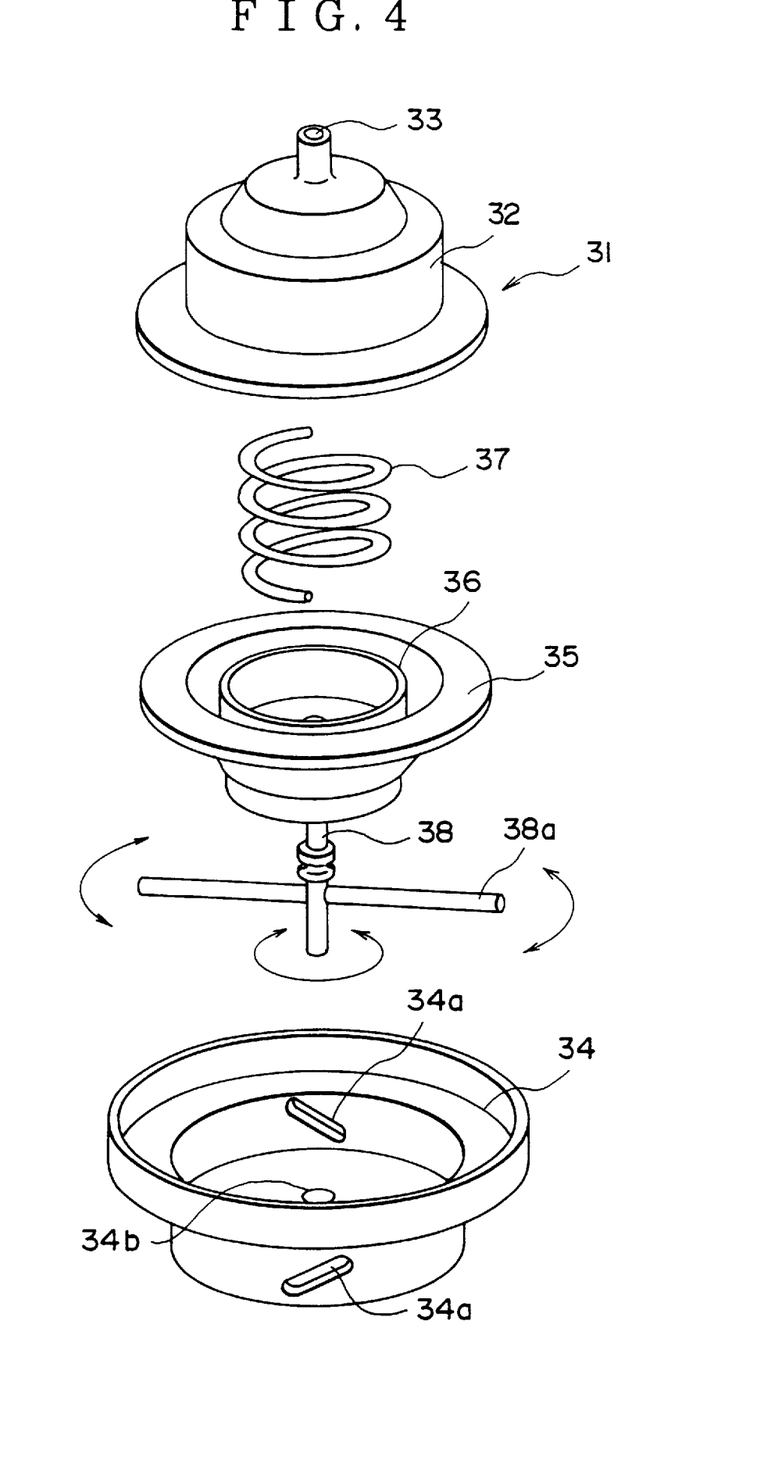
FIG. 4 is a fragmentary exploded perspective view of a second embodiment relating to the present invention.
Figure 5:
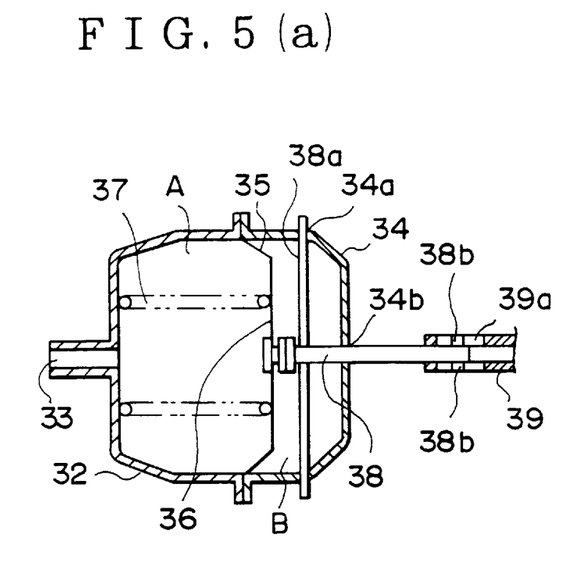
FIG. 5(a) is a side sectional view under normal condition.
FIG. 5(b) is a side elevational view of FIG. 5(a).
FIG. 5(c) is a side sectional view showing a state of rotating by D turn in C direction.
FIG. 5(d) is a side elevational view of FIG. 5(c)

A second embodiment of the present invention will be explained next with FIG. 4 and FIG. 5(a), FIG. 5(b), FIG. 5(c) and FIG. 5(d). FIG. 4 is a exploded perspective view of the actuator relating to the present invention and FIG. 5(a), FIG. 5(b), FIG. 5(c) and FIG. 5(d) are diagrammatic sectional views to explain the operating status of the actuator shown in FIG. 4. FIG. 5(a) is a figure showing in a normal state, FIG. 5(b) is a side elevational view of FIG. 5(a), FIG. 5(c) is a view showing a state that the rod of the actuator rotates in C direction by D turn and FIG. 5(d) is a side elevational view of FIG. 5(c).

In the figures, the actuator 31 relating to the embodiment is provided with an upper cover 32 having a negative pressure inlet 33, a lower cover 34 fixed on the upper cover 32 and having an open groove 34a obliquely formed on a side wall of the upper cover, a diaphragm 35 dividing into a first room A and a second room B attached between the upper cover 32 and the lower cover 34, a retainer 36 fixed to the diaphragm 35, a spring 37 fixed between the upper cover 32 and the retainer 36, the power rod 38 fitted in a rotatable manner to the retainer 36, and a shaft 38a attached to the top of the power rod 38 and also to the top of the lower cover 34 almost at a right angle and is engaged with the open groove 34a of the lower cover 34. The top of the power rod 38 protrudes outside of the cover 34 from the aperture 34b formed on the lower cover 34.

The actuator 31 thus constituted is in a normal state shown in FIG. 5(a). When a negative pressure is applied to the negative pressure inlet 33, the retainer 36 moves toward the negative pressure inlet 33. The power rod 38 moves with the motion of the retainer but as the shaft 38a of the power rod 38 is engaged with the aperture 34a of the lower cover 34, it moves in the aperture 34a. Consequently, the rod 38 rotates in C direction and closes the butterfly type valve 24 through rotating by about ninety degrees.

Thus, the power rod 38 attached with the valve shaft 22 can open and shut the butterfly valve 24.

When the rod 38 rotates in this embodiment, as the rod 38 moves in the direction of the shaft line, it is preferable to arrange a means to cancel the amount of the movement.

As shown in FIG. 5(a), FIG. 5(b), FIG. 5(c) and FIG. 5(d), a protrusion 38b is formed at the top of the power rod 38 and the protrusion 38b is engaged with an open groove 39a formed along the axis direction of a cylindrical connecting member 39, then the movement of the rod 38 in the axis direction is absorbed with the connecting member 39 and only the rotation is transmitted to the valve shaft 22.

Another embodiment of the present invention will be explained with the drawings from FIG. 6 to FIG. 10(a) and FIG. 10(b).

Figure 6:
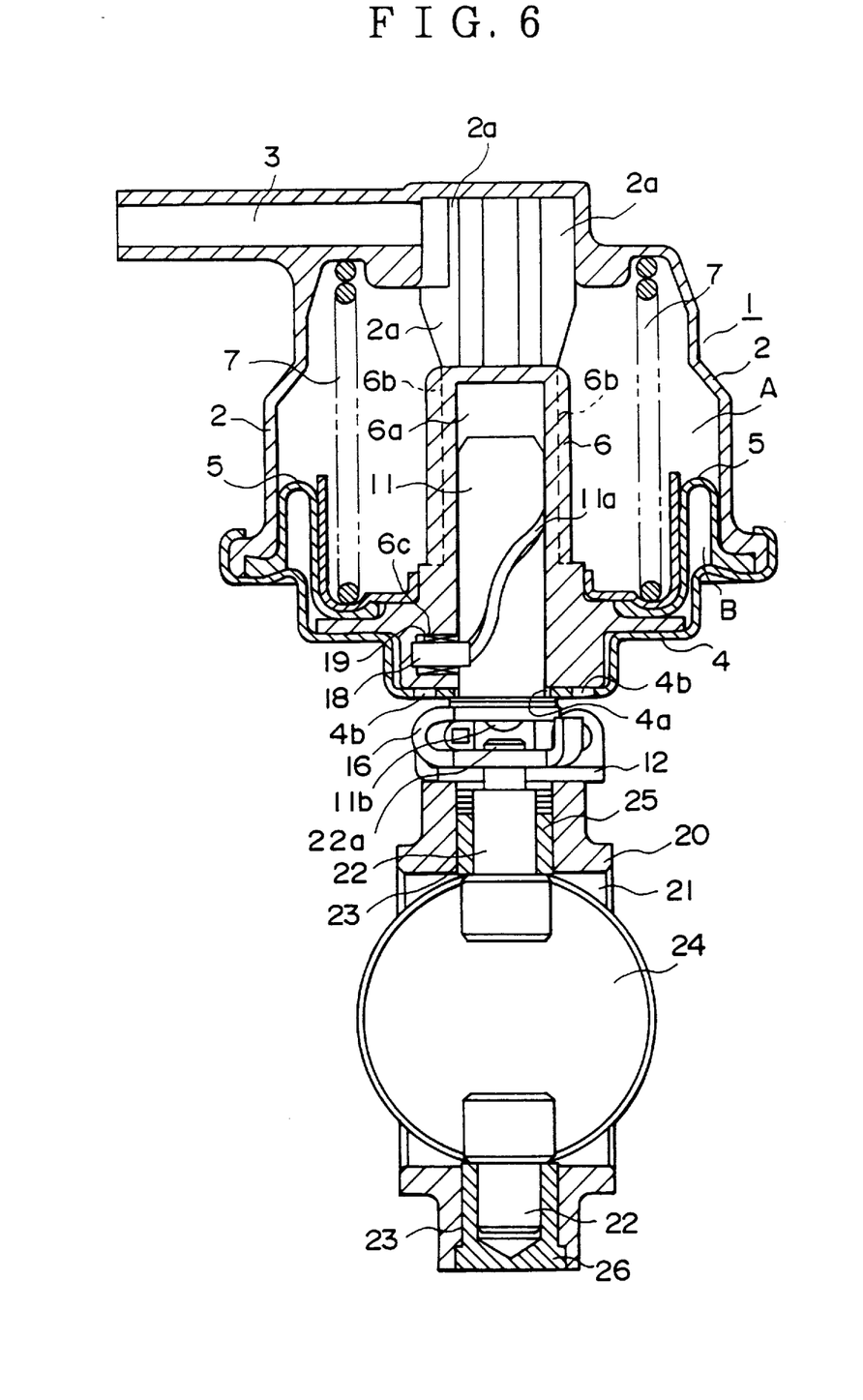
FIG. 6 is a front sectional view of the actuator and an exhaust gas control valve showing an opened state of the butterfly type valve relating to the present invention.
Figure 7:
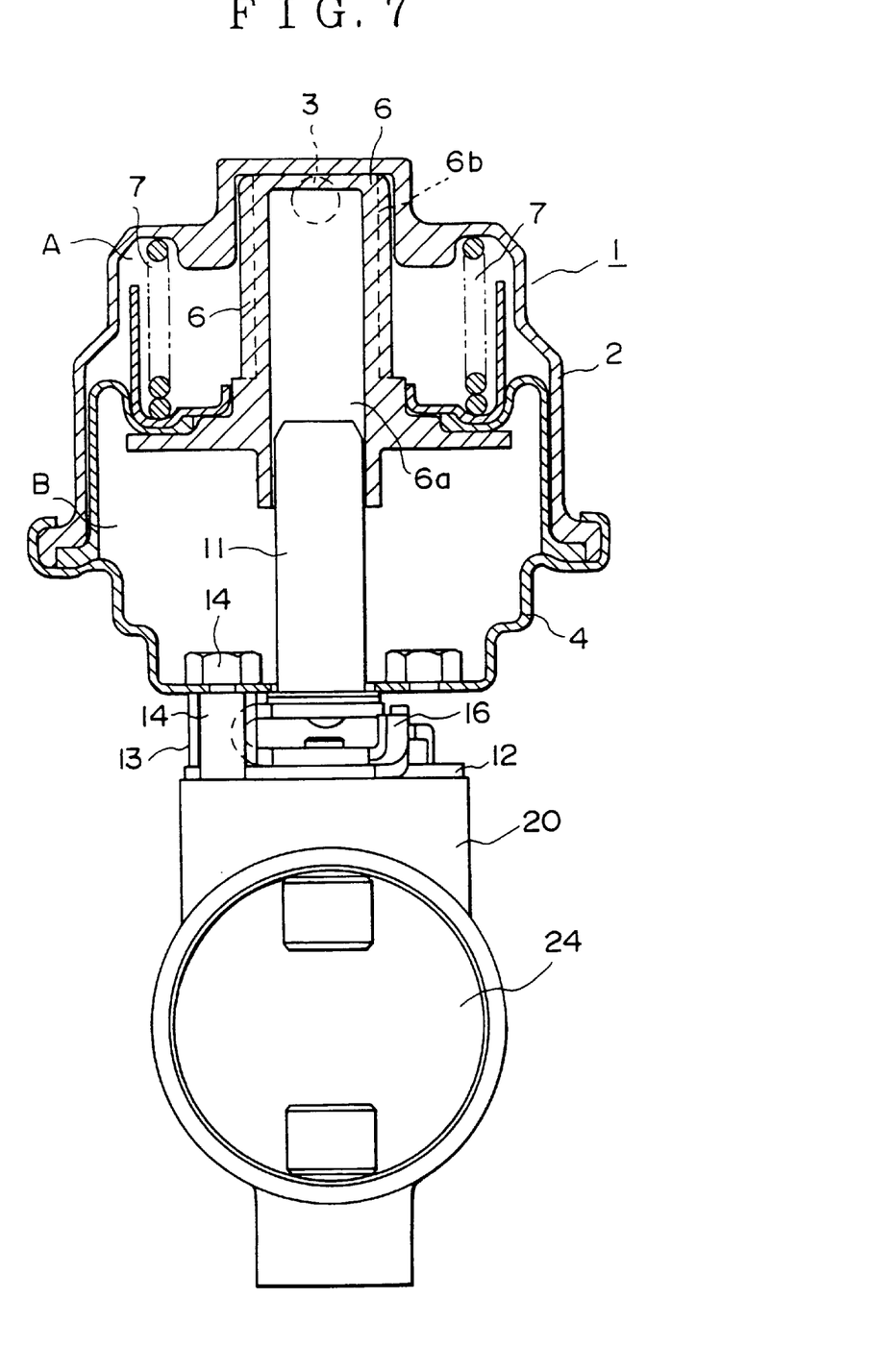
FIG. 7 is a side sectional view of the actuator and an exhaust gas control valve showing a closed state of the butterfly type valve relating to the present invention.
Figure 8:
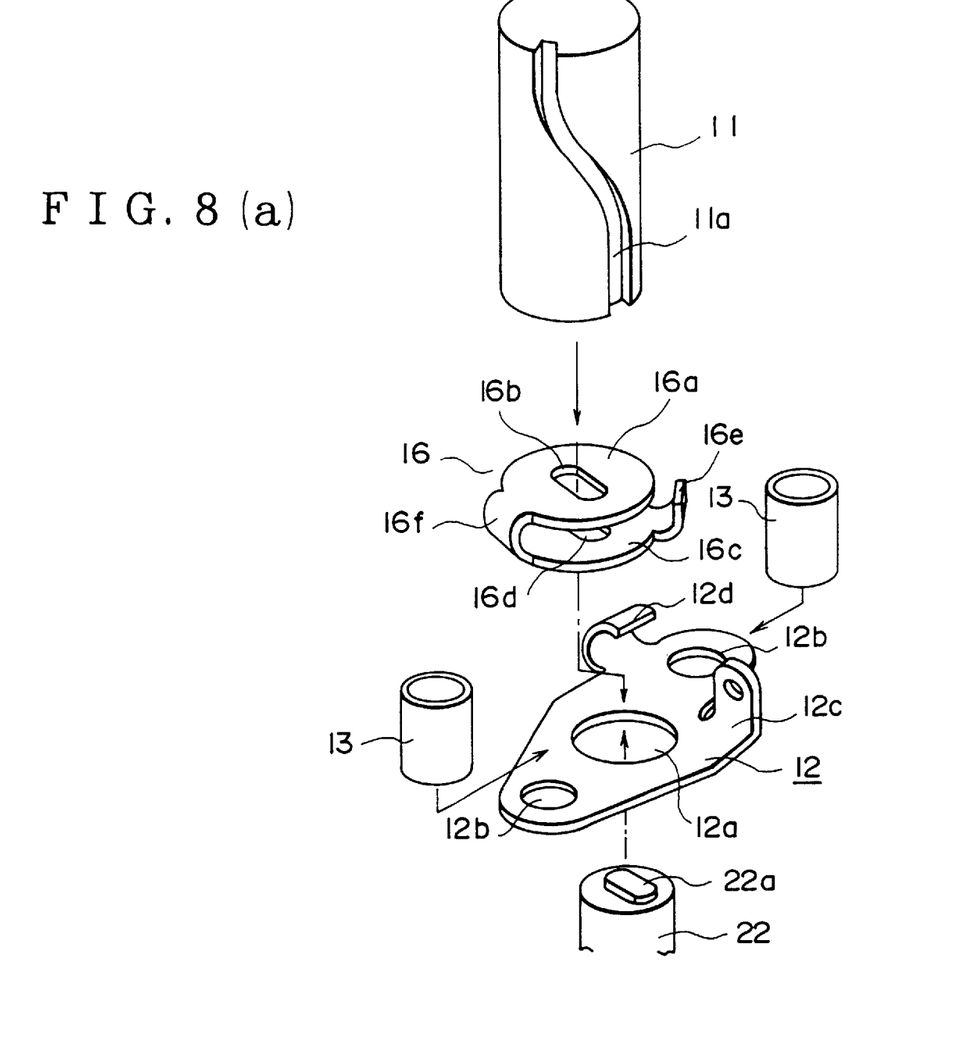
FIG. 8(a) and FIG. 8(b) are exploded perspective views of a connecting portion of the actuator and exhaust gas control valve relating to the present invention.

FIG. 6 is a front sectional view of the actuator and the exhaust gas control valve, showing an open state of the butterfly valve. FIG. 7 is a side sectional view of the actuator and the exhaust gas control valve relating to the present invention, showing a closed state of the butterfly valve. FIG. 8(a) and FIG. 8(b) are exploded perspective views of a connecting part between the actuator and the exhaust gas control valve relating to the present invention.

In FIG. 6, the actuator 1 is provided with an upper cover (a first cover) 2 having a negative pressure inlet 3, a lower cover (a second cover) 4 fixed to the upper cover 2, a diaphragm 5 fixed between the upper cover 2 and the lower cover 4, dividing into a first room A and a second room B, a retainer 6 attached to the diaphragm 5, a spring 7 fixed between the upper cover 2 and the retainer 6, a power rod 11 inserted in a movable manner into an inner portion 6a of the retainer 6, a groove 11a helically formed on the outer peripheral surface of the power rod 11 extending over one fourth of the outer periphery (about ninety degrees), a cylindrical roller 18 fixed and projecting from a side wall of the retainer 6 to the concave portion 6a and the top portion being inserted into the groove 11a, and a bearing 19 placed between the side wall of the retainer 6 and the roller 18.

The roller 18 is formed separately from the retainer 6 and installed on an inner portion 6c of the retainer 6 through the bearing 19, but it may be a protrusion integrally formed with the wall of the retainer 6.

The helical groove 11a is formed on the power rod 11, the roller or the protrusion may be formed on the side of the power rod 11 and the helical groove on the side of the retainer.

A guide piece 2a which is protruding from an upper surface is formed in the first room of the upper cover 2 and is inserted into a groove 6b formed along the axis on the outer peripheral surface of the retainer 6. Then, when the retainer 6 moves with the movement of the diaphragm 5, it can linearly move without rotating to the upper cover 2.

An aperture 4a through which the power rod 11 is inserted is formed on the bottom surface of the lower cover 2. Vent ports 4b for air flow to the second room B are provided on both side of the aperture 4a. The vent port 4b is arranged confronting with a connecting member 16 so that the connecting member 16 which will be explained later is exposed to an air exhausted from the second room.

A cylindrical exhaust channel 21 is formed in the body 20 of the exhaust gas control valve as shown in FIG. 6 and FIG. 7, and shaft holes 23 are bored on both sides to insert through the valve shaft 22. The butterfly type valve 24 is arranged in the exhaust channel in such a manner that it opens and closes the channel, and the valve 24 is fixed to the valve shaft 22. The valve shaft 22 is formed long to be connected to the actuator. The designation 26 in the figure is a bushing.

The connecting member 16 will be explained in detail using the drawings FIG. 8(a), FIG. 8(b), FIG. 9(a) and FIG. 9(b). The connecting member 16 is formed confronting two faces of the connecting member with each other in a lying-U shape, and a first surface 16a and a second surface 16c is unified with a connecting portion 16f. An oblong aperture 16b is formed on the first surface 16a as shown in FIG. 8(b) for being fitted by an oblong protrusion 11b formed on the top end surface of the power rod 11. The connecting member 16 and the power rod 11 are unified by caulking after fitting to the oblong protrusion 11b formed on the top end surface of the power rod 11 and the aperture 16b.

An oblong aperture 16d is formed on the second surface 16c confronting in parallel with the first surface 16a, for being fitted by an oblong protrusion 22a formed on the top end surface of the valve shaft 22. An engaging piece member 16e is formed on the second surface 16c, extending to the direction of the first surface 16a.

The power rod 11 is fixed on the first surface 16a of the connecting member 16 and the valve shaft 22 is engaged with the second surface 16c. Then the rotary motion of the power rod 11 is transmitted to the valve shaft 22 through the connecting member 16.

On the other hand, a plate 12 is fixed which stops the connecting member 16 at a predetermined angle on the end surface of the body 20 of the exhaust gas control valve having the butterfly type valve arranged in such a manner that the valve opens and shuts the passage in the exhaust channel.

An aperture 12a through which the valve shaft 22 is inserted, is formed at about the central portion of the plate 12 and apertures 12b through which bolts 14 connecting the lower cover 4 with the body are inserted through, are formed on the right and left of the aperture 12a, as shown in FIG. 8(a).

A vertical piece 12c to which the engaging piece 16e of the connecting member 16 attaches and a vertical piece 12d to which the connecting portion 16f attaches are also formed on the plate 12.

Figure 9A:
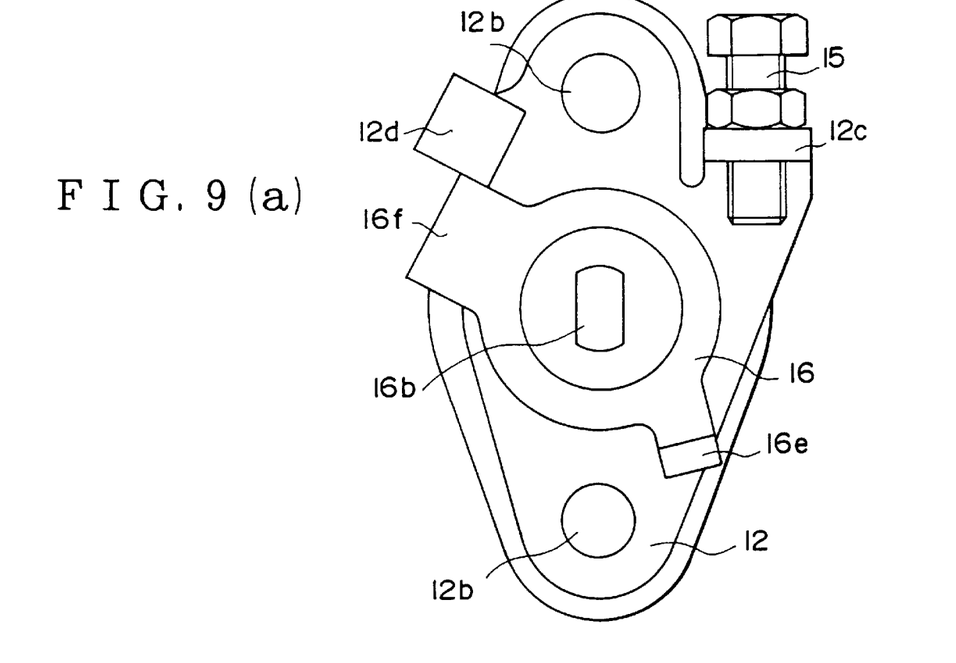
FIG. 9(a) is a plain view showing a full open state.
Figure 9B:
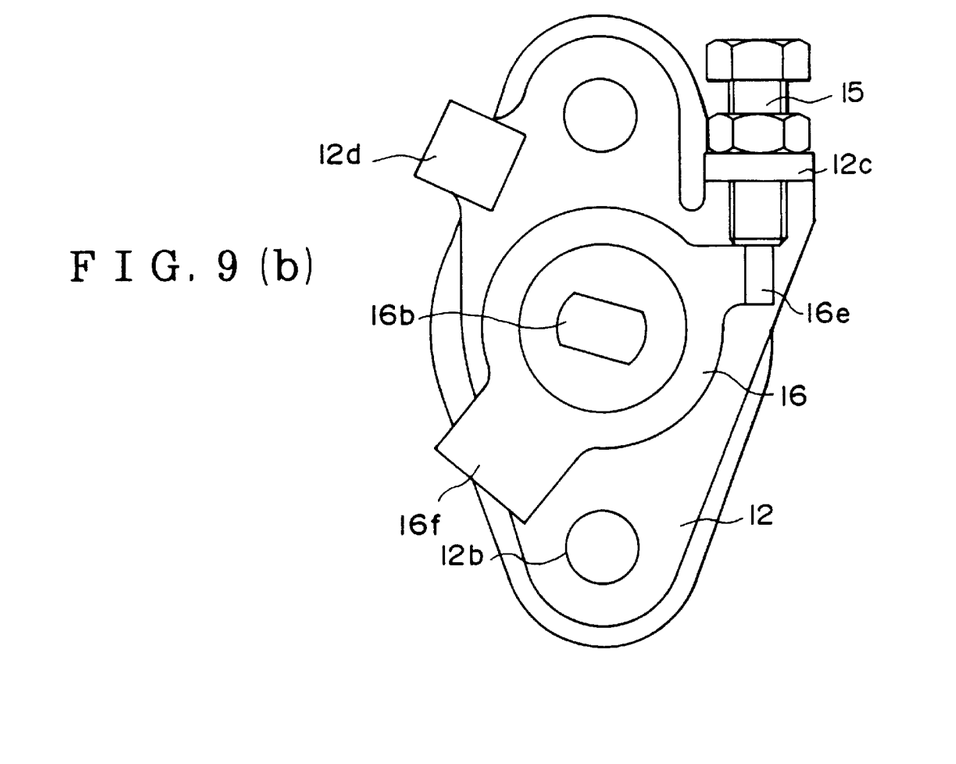
FIG. 9(b) is a plain view showing a full closed valve.

An adjusting bolt 15 is provided to the vertical piece 12c of the plate 12 to which the engaging piece 16e attaches as shown in FIG. 9(b), and can be adjusted so as that the valve completely closes the exhaust channel by changing the amount of protrusion.

FIG. 9(a) is a figure showing a state that the valve fully opens (full open state) from a state of full-close shown in FIG. 9(b) through turning of the connecting member 16 (the power rod shaft 11) by about ninety degrees. The rotation of the connecting member 16 is designed to be stopped when the connecting portion 16f touches to the vertical piece 12d.

A collar 13 made from low heat conductivity material such as resin is inserted between the plate 12 and the lower cover 4 so that heat transfer from the exhaust channel 21 is insulated and the body and the lower cover is mechanically linked while keeping a certain distance.

In other words, at the center of the collar 13, a through hole through which the bolt 14 connecting the body 20 with the lower cover 4 is inserted, is formed. The bolt mechanically unifies the body 20 and the lower cover 4 and the collar 13 keeps the distance between the body 20 and the lower cover 4 constant when unifying the both.

Incidentally, two pieces of the collars 13 are shown in FIG. 8(a), but one of the collars is omitted in FIG. 7.

The plate 12 is fixed on the side surface of the body 20 of the exhaust gas control valve with the bolt 14. As the connecting member 16 is fixed to the power rod 11, it is preferable that the length of the collar is made longer than the total thickness of the connecting member 16 and the plate 12 so that the contact area of the connecting member 16 with the plate 12 is minimized to minimize heat transfer from the valve shaft.

Figure 10A:
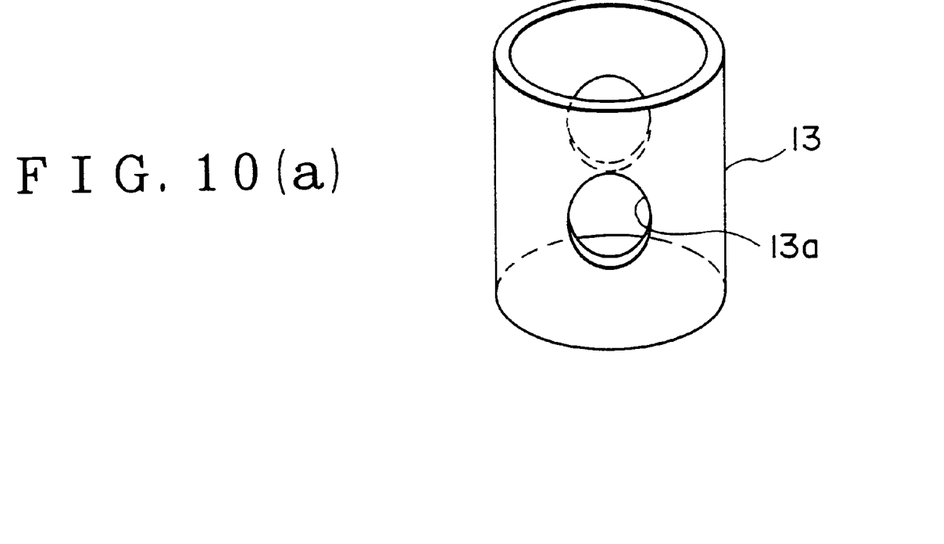
FIG. 10(a) and FIG. 10(b) are drawings of variations of the collar relating to the present invention.
Figure 10B:
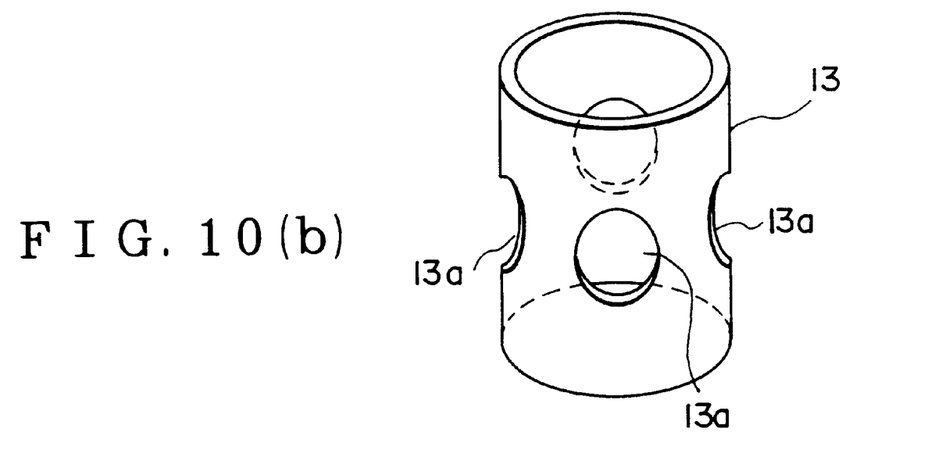

The collar 13 may have 2 apertures 13a as shown in FIG. 10(a). Then air in the collar 13 can be dispersed and heat can be dissipated from the collar 13. There is no limitation in the number of the apertures 13a and as shown in FIG. 10(b) it may be four.

The negative pressure inlet may be arranged on the lower cover 4, but in such cases, it becomes necessary to improve accuracy of finishing or is 1 provide an air-tight seal member for preventing air from flowing in through a gap between the power rod 11 and the lower cover 4. And in such cases, as the vent port 4b can not be provided on the bottom surface of the lower cover 2, an advantage of cooling the connecting member 16 by air flowing through the vent port 4b can not be expected.

As the spring 7 is for returning the retainer 6 back to the initial state, the spring 7 can be fitted between the lower cover 4 and the retainer 6, provided that the retainer can go back to the initial state.

The operation of the actuator and the exhaust brake unit relating to the present invention will be explained here.

Usually, the valve 24 is placed so as to open the cylindrical exhaust channel 21, as shown in FIG. 6. When a switch for the exhaust brake is turned on while the engine is set in motion and driver's feet are away from the accelerator pedal and clutch pedal, the actuator 1 changes from the state shown in FIG. 6 to that shown in FIG. 7 due to the negative pressure come from a vacuum tank installed on the vehicle.

In other words, negative pressure is brought into the first room through the negative pressure inlet 3 provided on the upper cover 2, the retainer moves toward the negative pressure inlet 3 in the figure, resisting the resilient force by the spring 7.

At this time, as a groove 6b formed on the outer peripheral surface of the retainer 6 is guided by the guide piece 2a of the upper cover 2, the retainer 6 moves linearly in contrast to the upper cover 2.

The retainer 6 is provided with the roller 18 and the top end portion of the roller 18 is engaged with the groove 11a of the power rod 11. Consequently, the roller 18 moves while rotating the power rod 11 along with the movement of the retainer 6 toward the negative pressure inlet 3.

The roller 18 is fixed to the retainer 6 through the bearing 19 so that the roller 18 moves in the groove 11a of the power rod 11 while rolling over around it's axis. Thus as the roller 18 moves in the groove 11a of the power rod 11 while rolling over around it's axis, the linear motion of the retainer 6 can be converted into rotary motion without resistance.

The rotation of the power rod 11 is transmitted to the connecting member 16 and the rotation is transmitted to the valve shaft 22 from the connecting member 11.

Thus, the rotary motion is produced by the power rod 11 of the actuator 1 and the rotation is transmitted to the valve shaft 22 connected with the power rod 11 and finally, as shown in FIG. 7, the exhaust channel 21 is closed by the valve body 24.

As described above, the exhaust brake unit performs a function as an auxiliary brake to cancel acceleration of a vehicle while descending a downward slope by controlling the exhaust gas amount through the exhaust gas control valve.

When the introduction of negative pressure from the vacuum tank installed on the vehicle is finished, the retainer moves in the opposite direction to the negative pressure inlet 3, the condition is returned from that shown in FIG. 7 to the condition shown in FIG. 6, reversing the above described process.

It is clear from above described explanation that in the actuator relating to the present invention, rotary motion can be transmitted from the power rod to the outside instrument.

In the cases that the actuator of the present invention is used in a exhaust brake unit, a conventional link system which converts linear motion into rotary motion is not necessary. Consequently, an exhaust brake unit using the actuator of the present invention can be reduced in size compared with a conventional exhaust brake unit and when installing on vehicles, it shows an advantage that it does not need so much space.

In the actuator relating to the present invention, as the rotary motion is transmitted from the power rod of the actuator, in assembling an exhaust brake unit, the actuator can be arranged so that the axis of the power rod and the axis of the valve shaft are aligned in a line.

Accordingly, a demand of placing the actuator in the same line with the valve shaft is satisfied and an advantage of no limitations in designing vehicles can be gained. Particularly, it can keep lower the height of the exhaust brake unit and as the actuator is not placed near the exhaust channel, another advantage that it does not require any means for protection of the actuator such as providing a heat shield plate in the outside of the cover of the actuator.

It has still another advantage that the actuator can be directly fixed to the valve shaft of the butterfly type shaft so that assembling can be carried out with ease.

Especially in the actuator described in claim 8, as the protrusion is made of a cylindrical roller, fixed on the side wall of the retainer or on the outer peripheral surface of the power rod, when the cylindrical roller moves in the groove, it moves in rolling over around the axis. Thus, when the linear motion of the retainer is converted into the rotary motion of the power rod, the resistance can be minimized.

And especially in the actuator described in claim 9, as vent ports are arranged on the bottom surface of the lower cover, the connecting member can be cooled by air passing through the vent ports. As a result, the heat transferred through the connecting member and the power rod can be minimized and the actuator can be protected from heat.

Then, it becomes possible to make the upper cover and the lower cover with resin and the weight of the actuator can be reduced.

In the exhaust brake unit according to claim 10, the top portion of the power rod is connected to the valve shaft of the exhaust gas control valve through the lying-U shape connecting member so that heat transferred through the valve shaft can be minimized and the actuator can be protected from heat. Moreover as the connecting member is formed in a lying-U shape and a heat radiation area is large, a heat radiation effect can be expected.

In the exhaust brake unit described in claim 14, a plate to halt the connecting member at a predetermined turning angle is fixed on an end surface of the body, near the actuator, of the exhaust gas control valve having a butterfly type valve provided in such a manner that it can open and close the passage in the exhaust channel. So the connecting member stops at a predetermined turning angle, full-close or full-open of the butterfly type valve is reliably performed.

In the exhaust brake unit described in claim 15, a collar is inserted between the cover of the actuator confronting the body and the body of the exhaust gas control valve having a butterfly type valve provided in such a manner that it can open and close the passage in the exhaust channel. Then, the actuator can be installed while keeping a certain distance to the body of the exhaust gas control valve.

Consequently, compared with the case that the actuator is directory fixed with the body of the exhaust gas control valve, heat transfer can be reduced, and the actuator can be protected from heat. As a result, the upper cover and the lower cover can be made from resin so that the weight of the actuator and the exhaust brake unit can be reduced.

It has yet another advantage that the actuator can be fixed to the valve shaft of the butterfly type shaft through the connecting member so that the assembling can be carried out with ease.

What is claimed is:

1. An actuator, comprising:

a first cover;

a second cover, fixed to said first cover;

a negative or positive pressure inlet provided on either said first cover or said second cover;

a diaphragm dividing said actuator into a first room and a second room attached between said first cover and the second cover;

a retainer attached to said diaphragm;

a spring attached between said first cover and said retainer or between said second cover and said retainer;

a power rod inserted into an inner portion of the retainer in a movable manner;

a helical groove formed on the outer peripheral surface of the power rod; and a protrusion on a side wall of the retainer protruding into the inner portion and having a top end portion inserted into the groove, wherein said protrusion is neither the retainer nor the power rod but a cylindrical roller fixed to the side wall of the retainer or to the outer peripheral surface of the power rod through a bearing.

2. An actuator, comprising:

a first cover;

a second cover, fixed to said first cover:

a negative or positive pressure inlet provided on either said first cover or said second cover;

a diaphragm dividing said actuator into a first room and a second room, attached between said first cover and the second cover;

a retainer attached to said diaphragm;

a spring attached between said first cover and said retainer or between said second cover and said retainer;

a power rod inserted into an inner portion of the retainer in a movable manner;

a helical groove formed on the outer peripheral surface of the power rod; and a protrusion on a side wall of the retainer protruding into the inner portion and having a top end portion inserted into the groove, wherein the first cover is an upper cover and the second cover is a lower cover and the negative or positive pressure inlet is formed on the upper cover, the diaphragm fixed between the upper cover and the lower cover dividing said actuator into said first room and s second room, the retainer fixed to the diaphragm, the spring installed between the upper cover and the retainer, a vent port provided on a bottom surface of the lower cover making an air passage therethrough.

3. An exhaust brake unit comprising:

an actuator provided with a power rod of an actuator having a first cover, a second cover fixed to said first cover, a negative or positive pressure inlet provided on either said first cover or said second cover, a diaphragm dividing said actuator into a first room and a second room and attached between said first cover and the second cover, a retainer attached to said diaphragm, a spring attached between said first cover and said retainer or between said second cover and said retainer, a conversion mechanism converting linear motion of said retainer into rotary motion, and the power rod transmitting the output of the rotary motion through said conversion mechanism to the outside; and an exhaust gas control valve provided with a butterfly type valve arranged in such a manner to open and close a passage in an exhaust channel of said exhaust brake unit, wherein an end portion of said power rod is connected to a valve shaft of said exhaust gas control valve through a lying-U shape connecting member.

4. The exhaust brake unit according to claim 3, wherein the conversion mechanism to convert linear motion of the retainer to rotary motion is provided with the power rod inserted into an inner portion of said retainer in a movable manner, a helical groove formed on the outer peripheral surface of the power rod, and a protrusion having a top end portion formed on a side wall of the inner portion of said retainer and having the top end portion of the protrusion inserted into said groove, or, the conversion mechanism is provided with the power rod inserted into the inner portion of said retainer in a movable manner, the protrusion formed on the outer peripheral surface of the vower rod, and the helical groove formed on the inner portion of the retainer, the top end portion of the protrusion inserted in said groove.

5. The exhaust brake unit according to claim 4, wherein said protrusion is neither said retainer nor said power rod but a cylindrical roller fixed to the side wall of said retainer or the outer peripheral surface of said power rod through a bearing.

6. The exhaust brake unit according to claim 3, wherein said first cover corresponds to an upper cover and said second cover corresponds to a lower cover and the negative or positive pressure inlet is on said upper cover, the diaphragm installed between said upper cover and said lower cover and dividing said actuator into said first room and said second room, the retainer attached to the diaphragm, the spring attached between said upper cover and the retainer, the power rod inserted into an inner portion of said retainer in a movable manner, and a vent port arranged on a bottom surface of the lower cover confronting with the lying-U shaped connecting member which is cooled by air passing through said port.

7. The exhaust brake unit according to claim 3, wherein a plate to halt the connecting member at a predetermined turning angle is fixed on an end surface of the body, near the actuator, of said exhaust gas control valve.

8. An actuator, comprising:

a first cover;

a second cover, fixed to said first cover;

a negative or positive pressure inlet provided on either said first cover or said second cover;

a diaphragm dividing said actuator into a first room and a second room, attached between said first cover and the second cover;

a retainer attached to said diaphragm;

a spring attached between said first cover and said retainer or between said second cover and said retainer;

a power rod inserted into an inner portion of the retainer in a moveable manner;

a protrusion having a top end portion formed on the outer peripheral surface of the power rod; and a helical groove formed on the inner portion of the retainer, the top end portion of the protrusion inserted into said groove, wherein said protrusion is neither the retainer nor the power rod but a cylindrical roller fixed to the side wall of the retainer or to the outer peripheral surface of the power rod through a bearing.

9. An actuator, comprising:

a first cover;

a second cover, fixed to said first cover:

a negative or positive pressure inlet provided on either said first cover or said second cover;

a diaphragm dividing said actuator into a first room and a second room, attached between said first cover and the second cover;

a retainer attached to said diaphragm;

a spring attached between said first cover and said retainer or between said second cover and said retainer;

a power rod inserted into an inner portion of the retainer in a movable manner;

a protrusion having a top end portion formed on the outer peripheral surface of the power rod; and a helical groove formed on the inner portion of the retainer, the top end portion of the protrusion inserted into said groove, wherein the first cover is an upper cover and the second cover is a lower cover and the negative or positive pressure inlet is formed on the upper cover, the diaphragm fixed between the upper cover and the lower cover dividing said actuator into said first room and said second room, the retainer fixed to the diaphragm, the spring installed between the upper cover and the retainer, a vent port provided on the bottom surface of the lower cover making an air passage therethrough.

10. The actuator according to claim 1, wherein the first cover is an upper cover and the second cover is a lower cover and the negative or positive pressure inlet is formed on the upper cover, the diaphragm fixed between the upper cover and the lower cover dividing said actuator into said first room and said second room, the retainer fixed to the diaphragm, the spring installed between the upper cover and the retainer, a vent port provided on a bottom surface of the lower cover making an air passage therethrough.

11. The actuator according to claim 8, wherein the first cover is an upper cover and the second cover is a lower cover and the negative or positive pressure inlet is formed on the upper cover, the diaphragm fixed between the upper cover and the lower cover dividing said actuator into said first room and said second room, the retainer fixed to the diaphragm, the spring installed between the upper cover and the retainer, a vent port provided on a bottom surface of the lower cover making an air passage therethrough.

12. The exhaust brake unit according to claim 4, wherein said first cover corresponds to an upper cover and said second cover corresponds to a lower cover and the negative or positive pressure inlet is on said upper cover, the diaphragm installed between said upper cover and said lower cover and dividing said actuator into said first room and said second room, the retainer attach to the diaphragm, the spring attached between said upper cover and the retainer, and a vent port arranged on a bottom surface of the lower cover confronting with the lying-U shaped connecting member which is cooled by air passing through said vent port.

13. The exhaust brake unit according to claim 4, wherein a plate to halt the connecting member at a predetermined turning angle is fixed on an end surface of the body, near the actuator, of said exhaust gas control valve.

14. The exhaust brake unit according to claim 6, wherein a plate to halt the connecting member at a predetermined turning angle is fixed on an end surface of the body, near the actuator, of said exhaust gas control valve.

15. The exhaust brake unit according to claim 12, wherein a plate to halt the connecting member at a predetermined turning angle is fixed on an end surface of the body, near the actuator, of said exhaust gas control valve.

* * * * *